July 25, 1939.  F. M. KISER  2,167,576
SOLAR HEATER
Filed Aug. 25, 1937  2 Sheets-Sheet 1

Fred M. Kiser
INVENTOR
BY Victor J. Evans & Co.
ATTORNEYS

July 25, 1939.   F. M. KISER   2,167,576
SOLAR HEATER
Filed Aug. 25, 1937   2 Sheets-Sheet 2
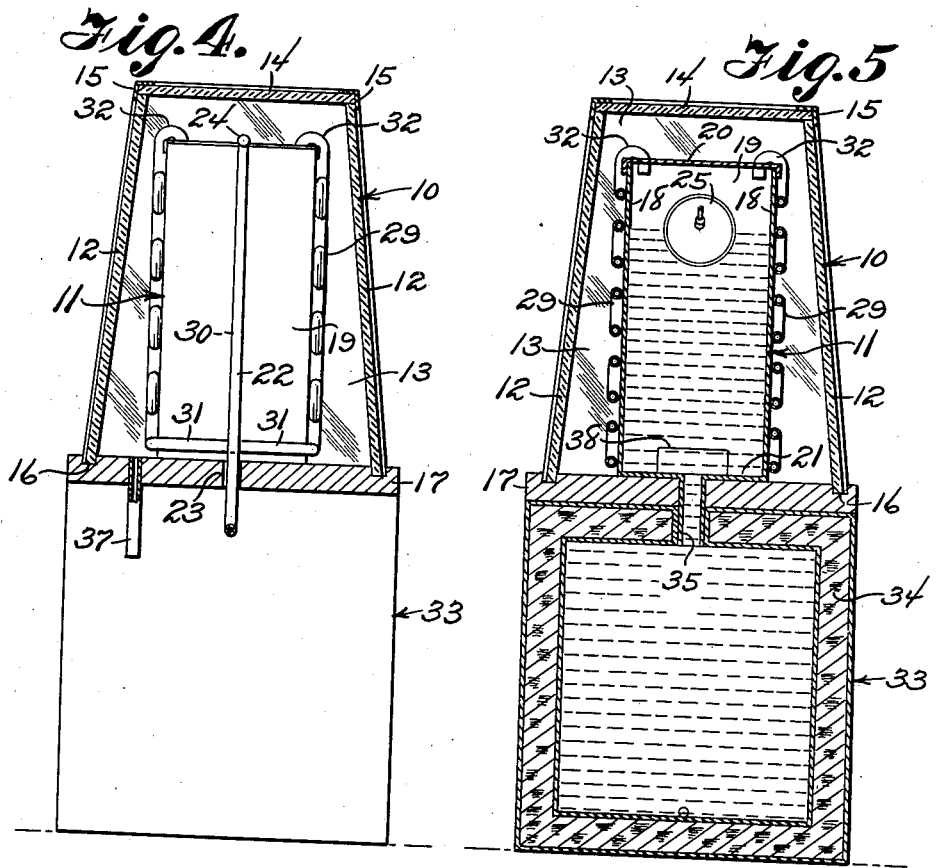
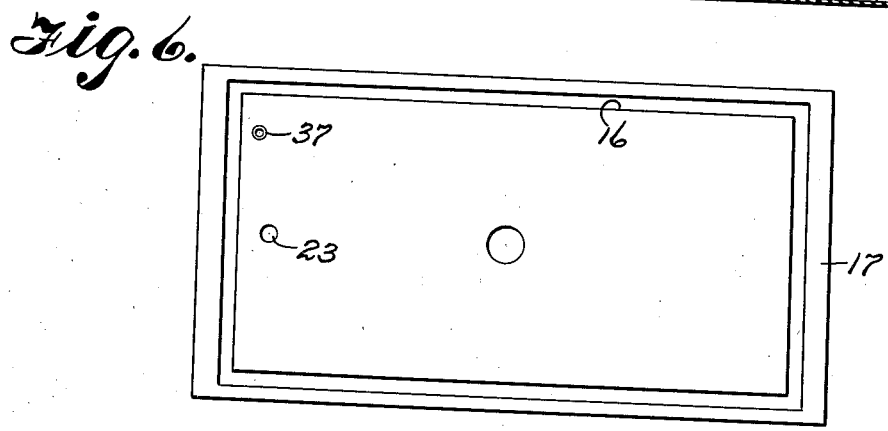
Fred M. Kiser
INVENTOR
BY Victor J. Evans & Co.
ATTORNEYS Patented July 25, 1939

2,167,576

UNITED STATES PATENT OFFICE 2,167,576

SOLAR HEATER

Fred M. Kiser, Los Angeles, Calif.

Application August 25, 1937, Serial No. 160,907

2 Claims. (Cl. 126—271)

This invention relates to solar heaters and has for an object to provide a self-contained solar heater and storage tank wherein the water is maintained at a predetermined temperature, electrical heating means being provided when the sun is not shining or when the quantity of heated water being drawn from the system exceeds the quantity of water being heated by the sun's rays.

A further object is to provide apparatus of this type in which the supply of water is automatically controlled so that a predetermined water level will always exist in the water heating tank.

A further object is to provide apparatus of this type in which the glass hood, and the water heating tank, are superposed upon an insulated storage tank, the heated water flowing by gravity into the storage tank so that the storage tank will always remain full to supply any number of spigots, the entire assembly being portable, and being self-contained.

A further object is to provide apparatus of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 4 is a cross sectional view taken on the line 4—4 of Figure 3.

Figure 5 is a cross sectional view taken on the line 5—5 of Figure 3.

Figure 6 is a plan view of the hood and heater tank supporting base shown in Figure 3.

Figure 1:
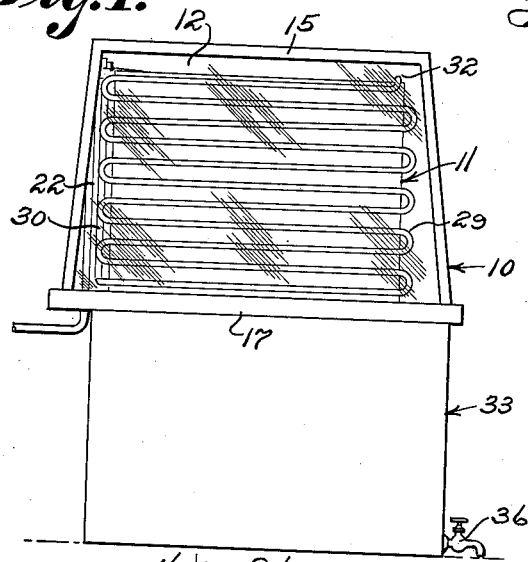
Figure 1 is a side elevation of a solar heater constructed in accordance with the invention.

Referring now to the drawings in which like characters of reference designate similar parts in the various views, 10 designates a cover or hood formed of material adapted to concentrate the sun's rays upon the water heating tank 11 within the hood. The size and shape of the hood is determined by the hot water requirements and the hood preferably comprises upwardly inclined glass side walls 12, glass end walls 13 and a glass top wall 14, the walls being connected together and reinforced at their intersections by angle iron strips 15. The bottom of the hood is open and fits air tight in a groove 16, formed in a supporting base 17, best shown in Figure 6.

Figure 3:
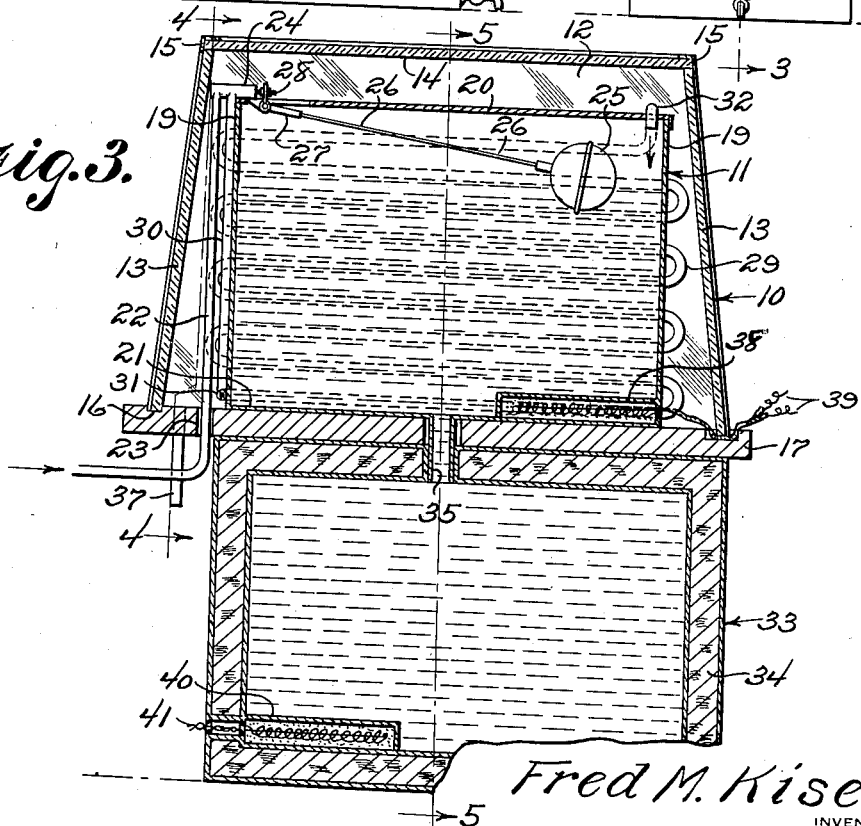
Figure 3 is a longitudinal sectional view of the solar heater drawn to an enlarged scale.

The water heating tank 11 is substantially rectangular in contour and may be formed of any heat absorbing material such as copper for example, and constitutes a hot water container. The tank includes side walls 18, end walls 19, and top and bottom walls 20 and 21, best shown in Figures 3 and 5. A water supply pipe 22, best shown in Figures 3 and 4, and preferably connected to the city water supply system, extends upwardly through an opening 23 disposed near one end of the supporting base 17 and above the top wall of the water heating tank is equipped with a cut off valve 24, best shown in Figure 3. The valve is automatically controlled by a float 25, having its stem 26 connected to a bell crank 27 which is connected to the valve stem 28.

The water heating tank 11 forms a support for heater coils 29 preferably arranged to extend longitudinally along the opposite sides of the water heating tank as best shown in Figures 1, 3, 4 and 5. A supply pipe 30 extends from the valve 24 and is provided at the bottom with lateral branch pipes 31, best shown in Figure 4, which are connected to the bottom run of respective ones of the coils 29. The top runs of the coils are respectively equipped with hook-like discharge spouts 32, best shown in Figure 5, which hook over the top wall 19 of the water heating tank and extend into the tank through slots formed in the top wall.

Water under pressure will thus flow through the pipes and into the tank until a predetermined water level is reached in the tank whereupon the float 25 will close the valve. The sun's rays striking through the glass hood will heat the coils 29 and the hot water therein will flow through the spouts 32 into the water heating tank 11 when the valve 24 is opened by lowering of the float 25, or when the water level is lowered in the tank 11, thus automatically maintaining a predetermined water level by pressure. The coils are preferably formed of good heat conducting material such as copper.

Figure 2:
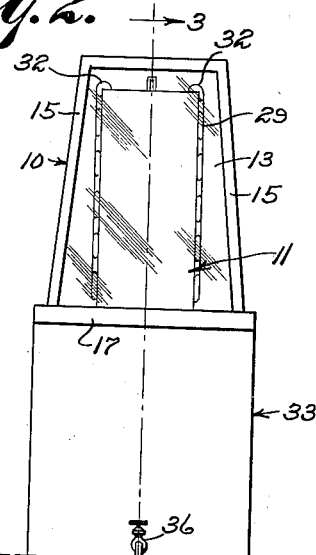
Figure 2 is an end elevation of the solar heater shown in Figure 1.

The supporting base 17 is supported upon the top of a double walled hot water storage tank 33 which is preferably rectangular in contour. The space between the walls of the tank is filled with cork insulation 34 or other good insulating material. An outlet pipe 35 projects through the top wall of the storage tank and through the supporting base 17, and enters the bottom of the water heating tank 11. Hot water from the water heating tank may be let into the storage tank by opening a suitable spigot 36 connected to the storage tank, as best shown in Figures 1 and 2, or may be piped from the storage tank to any desired locality.

A drain pipe 37 projects through the supporting base 17 outside of the storage tank and enters the bottom of the space between the water heating tank and the hood 10 to drain off any overflow from the water heating tank.

An electric heater 38 is disposed in the bottom of the water heating tank and may be connected by circuit wires 39 to any source of electricity. A suitable switch of course is employed to close the circuits through the coil from some remote point. A similar electric heater 40 is disposed in the bottom of the storage tank and is connected to a switch controlled suitable source of current supply by circuit wires 41. These heaters are turned on when weather conditions are not suitable to heat the water in the water heating tank and also whenever the quantity of heated water drawn from the system exceeds the quantity of water being heated by the sun's rays.

From the above description it is thought that the construction and operation of the invention will be fully understood without further explanation.

What is claimed is:

1. A solar heater comprising a glass hood, a supporting base having a groove receiving the lower edge of the hood, a water heating tank supported on the base within the hood, a water supply pipe entering the tank, a float controlled valve in said pipe, water heating coils disposed exteriorly of the said tank and exposed to sun rays passing through the hood, said water heating coils being connected at one end to said pipe and at the opposite end projecting into the top of the water heating tank, an insulated storage tank disposed underneath and supporting the insulating base, a draw off spigot connected to the storage tank, and a pipe extending through said insulating base and opening into the bottom of the water heating tank and opening into the top of the storage tank for permitting the contents of the water heating tank being drawn off through the storage tank.

2. A solar heater comprising a glass hood, a supporting base having a groove receiving the lower edge of the hood, a water heating tank supported on the base within the hood, a water supply pipe entering the tank, a float controlled valve in said pipe, water heating coils disposed exteriorly of the said tank and exposed to sun rays passing through the hood, said water heating coils being connected at one end to said pipe and at the opposite end projecting into the top of the water heating tank, an insulated storage tank disposed underneath and supporting the insulating base, a pipe extending through said insulating base and opening into the bottom of the water heating tank and opening into the top of the storage tank, a draw off spigot connected to the storage tank and electrically operated heating devices in said water heating tank and in said storage tank.

FRED M. KISER.